United States Patent

Koelbl et al.

(10) Patent No.: US 7,537,276 B2
(45) Date of Patent: May 26, 2009

(54) OPERATOR'S CONTROL DEVICE FOR A SHADE ARRANGEMENT

(75) Inventors: Michael Koelbl, Neuried (DE);
Wolfgang Suess, Freising (DE);
Horst-Martin Schulz, Weil (DE); Karin Langguth, Gauting (DE); Michaela Nowak, Munich (DE); Thomas Rudolph, Hechendorf (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/573,622

(22) PCT Filed: Aug. 9, 2005

(86) PCT No.: PCT/DE2005/001412

§ 371 (c)(1),
(2), (4) Date: Jul. 25, 2007

(87) PCT Pub. No.: WO2006/015586

PCT Pub. Date: Feb. 16, 2006

(65) Prior Publication Data

US 2007/0278818 A1    Dec. 6, 2007

(30) Foreign Application Priority Data

Aug. 11, 2004  (DE) ................... 10 2004 039 094

(51) Int. Cl.
*B60J 3/02* (2006.01)
(52) U.S. Cl. ........................... 296/214; 160/242
(58) Field of Classification Search ......... 160/242–246; 296/214
See application file for complete search history.

(56) References Cited

U.S. PATENT DOCUMENTS

| | | | |
|---|---|---|---|
| 3,089,729 A | * | 5/1963 | Kumai .................. 296/155 |
| 5,760,554 A | * | 6/1998 | Bustamante ............ 318/280 |
| 6,056,352 A | | 5/2000 | Ewing et al. |

FOREIGN PATENT DOCUMENTS

| | | |
|---|---|---|
| DE | 10140239 A1 | 3/2003 |
| DE | 10230443 A1 | 1/2004 |
| DE | 102004020338 A1 | 8/2005 |
| FR | 2848919 A1 | 6/2004 |

OTHER PUBLICATIONS

International Search Report for International Application No. PCT/DE2005/001412.

* cited by examiner

*Primary Examiner*—Dennis H Pedder
(74) *Attorney, Agent, or Firm*—David S. Safran; Roberts Mlotkowski Safran & Cole, P.C.

(57) ABSTRACT

This arrangement relates to an operating and control means for a shade arrangement, especially for a vehicle roof with a transparent roof surface, the shade arrangement comprising at least one shade with a shade roller and a shade fabric which can be unrolled therefrom by means of an electric actuator against the forms of a return spring assigned to the shade roller, and the shade roller with entrainment of the shade fabric being movable in side guide rails in order to move the shade surface formed by the unrolled shade fabric. As claimed in the invention, the operating means for this shade arrangement comprises a first switch arrangement (56) for setting the size of the shading surface formed by the shade fabric by taking up and unrolling the shade fabric, and a second switch arrangement (58) for moving the shading surface as a whole without changing its size.

3 Claims, 4 Drawing Sheets

OPERATOR'S CONTROL DEVICE FOR A SHADE ARRANGEMENT

BACKGROUND OF THE INVENTION

1. Field of the Invention

This invention relates to an operating and control means for a shade arrangement, especially for a vehicle roof with a transparent roof surface, the shade arrangement having at least one shade with a shade roller and a shade fabric which can be unrolled therefrom by means of an electric actuator against the force of a return spring assigned to the shade roller, and the shade roller, with entrainment of the at least partially unrolled shade fabric, being movable in side guide rails in order to move the shade surface formed by the unrolled shade fabric. These shade arrangements are used especially as shading means for a motor vehicle roof with a transparent roof surface. This invention is however not limited to this application.

2. Description of Related Art

German Patent Application Publication DE 10 2004 020 338 A1 discloses a shade arrangement of the initially mentioned type, which has two shades with rollers which can be moved in side guide rails, each by means of separate actuators and with shade fabrics which are connected to one another on their free ends, for example, by means of a common pull which is guided likewise in the guide rails (twin shade). The shade fabrics are unrolled by moving one or both shade rollers, due to the roughly identically strong return springs of the two shade rollers, the pull being balanced roughly in the middle between the shade rollers. When the position of the shading surface formed by the unrolled shade fabrics is to be changed without changing its size, the two shade rollers must be moved in the same direction. Since, for example, the driver of a motor vehicle generally has only one hand free for this operating process, he must first move one of the shade rollers, and afterwards, the other, generally, the size of the shading surface also being unintentionally changed.

SUMMARY OF THE INVENTION

The object of this invention is to devise an operating and control means for a shade arrangement of the initially mentioned type which simplifies adjustment of the size of the shading surface, on the one hand, and the position of this shading surface on the other, and thus, for example, can relieve the driver of the vehicle.

This object is achieved in accordance with the invention by an operating and control means that comprises a first switch arrangement for setting the size of the shading surface by taking up and unrolling of the shade fabric or fabrics, and a second switch arrangement to move the shading surface as a whole without changing its size. Downstream from the switch arrangements is a control which, for certain switch positions of the switch arrangements, triggers the actuators for the purposes of the above described functions, as is explained below.

In the simplest configuration, the shade arrangement comprises a shade, the roller of the shade and a pull which is located on the free end of the shade fabric being movable in side guide rails by means of separate actuators. The first switch arrangement is designed such that the actuators of the shade roller and of the pull can each be triggered for purposes of taking up or unrolling the shade fabric individually or also jointly, each in opposite directions for purposes of taking up or unrolling the shade fabric. The second switch arrangement is designed such that the two actuators can each be triggered jointly for simultaneous adjustment in the same direction, and in the same amount. Accordingly, the first switch arrangement makes it possible via the movable pull and/or movable shade roller to change the size of the shading surface, while the second switch arrangement makes it possible to move the shading surface as a whole (as a package) without changing its size.

According to another preferred embodiment of the invention, the shade arrangement has the above described configuration of a so-called twin-shade. It comprises two shades, with rollers which can be moved in side guide rails, each by means of separate actuators, and with shade fabrics which are connected to one another on their free ends, optionally, via a common pull that is likewise guided in the guide rails, in order to avoid sagging. In this case, the first switch arrangement is designed such that the actuators of the two shade rollers can be triggered either individually or also jointly, each in opposite directions for purposes of making the shading surface larger or smaller, while the second switch arrangement is designed such that the actuators can be triggered jointly for simultaneous adjustment in the same direction and in the same amount. As is described using the first embodiment, in this way, by means of the first switch arrangement, the size of the shading surface, and by means of the second switch arrangement, the position of the shading surface can be set.

In a third configuration of the invention, the shade arrangement comprises, in turn, two shades with rollers which, however, are located directly together and the assigned shade fabrics can each be taken up or unrolled in opposite directions. The two shade rollers can be jointly moved freely in the guide rails, while the pulls located on the free ends of the shade fabrics can each be moved via separate actuators. In a manner that is analogous to the above described embodiments, it is then provided that the actuators of the two pulls can be triggered individually or jointly via the first switch arrangement, each in opposite directions for purposes of making the shading surface larger or smaller, while the second switch arrangement is designed such that the actuators can be triggered jointly for simultaneous adjustment in the same direction and in the same amount. This arrangement also makes it possible to easily set the size of the shading surface, on the one hand, and the position of the shading surface, on the other hand.

The first switch arrangement, according to one configuration of the invention, comprises two switches, each assigned to one of the two actuators, each switch having two operating positions to individually trigger the assigned actuators, each in the unrolling direction or take-up direction. This configuration makes it possible to determine the position of the shading surface when the size of the shading surface is being set depending on which of the two actuators is actuated and for how long. The shading surface is adjusted as a whole via the second switch arrangement described in more detail below.

In order to simplify the adjustment of the size of the shading surface, according to another configuration of the invention, it is provided that the first switch arrangement comprises only one switch which is assigned jointly to the two actuators, this switch having two operating positions in order to trigger the two actuators jointly in opposite directions for purposes of making the shading surface larger or smaller. With this switch arrangement, the shading surface is always made larger or smaller symmetrically to a crosswise center line so that, in this respect, the position of the shading surface as a whole is not influenced in this phase.

The second switch arrangement, according to one configuration of the invention, comprises two switches which are assigned to the two actuators, the switches each switch having an operating position to trigger the two actuators jointly in the same direction in one direction of adjustment and with the other switch in the other direction of adjustment.

In another configuration of the invention, the second switch arrangement also comprises only one switch, which is assigned to the two actuators, this switch having two operating positions to trigger, in one operating position, the two actuators jointly in the same direction in one direction of adjustment, and in the other operating position, in the other direction of adjustment.

It is noted here that the above described operating positions are each active operating positions in which the assigned actuators are actuated. It goes without saying that each of the switches, in addition, has an inactive neutral position in which current supply to the actuators is interrupted. Switches for the switch arrangements can be switches of any design and manner of operation to the extent they can cause only the above described operating processes.

With respect to their manner of operation, according to one configuration of the invention, there are so-called ON-OFF switches that automatically reset into the neutral position. The switches are pressed by the operator into the respective operating positions, and which return to their inactive neutral position after the switches are released.

According to another configuration of the invention, the switches are designed as selector switches with a position each corresponding to a certain position of the assigned drive means. In order for example to unroll the shade halfway, the assigned switch is moved over half of its operating path. When the actuator has reaches the assigned position, current supply is automatically turned off and the actuator remains in the position which has been reached.

With respect to their construction, individual or all switches can be made as toggle switches, as sliding-dolly switches or sliding-dolly regulators, as contact switches or the like.

Several embodiments of the invention are shown in the drawings and explained in detail below.

DETAILED DESCRIPTION OF THE INVENTION

Figure 1:
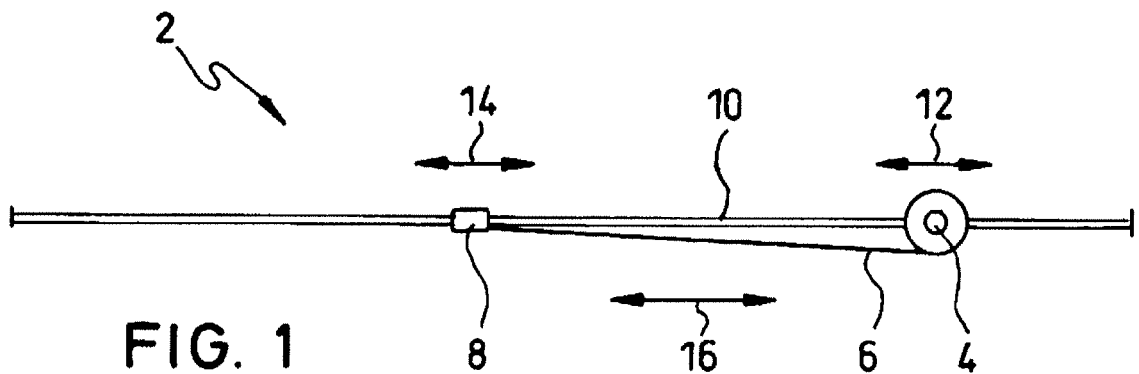
FIG. 1 is schematic side view of a shade arrangement with a shade.

FIG. 1 schematically shows a side view of a shade arrangement 2 with a shade roller 4, a shade fabric 6 which can be taken up onto the shade roller 4, and a pull 8 located on the free end of the shade fabric 6. The shade roller 4 is supported to be able to move in two side guide rails, of which only one guide rail 10 is shown, in the direction of the double arrow 12 by means of an electrical actuator (not shown). In the same way, the pull 8 is located in the guide rails (guide rail 10) so as to be movable by means of an actuator (not shown) in the direction of the double arrow 14.

In order to change the shading surface formed by the at least partially unrolled shade fabric 6, the shade roller 4 and/or the pull 8 can be moved for purposes of the desired change. In order, for example, to make the shading surface smaller, the shade roller 4 can be moved to the left in FIG. 1 or the pull 8 can be moved to the right, or the shade roller 4 and the pull 8 can be moved against one another.

In order to adjust the position of the shading surface which has been formed by the shade fabric 6 in the direction of the double arrow 16 without, at the same time, changing the size of the shading surface, the shade roller 4 and the pull 8 can be moved to the left or right by the same amount at the same time and in the same direction.

Figure 2:
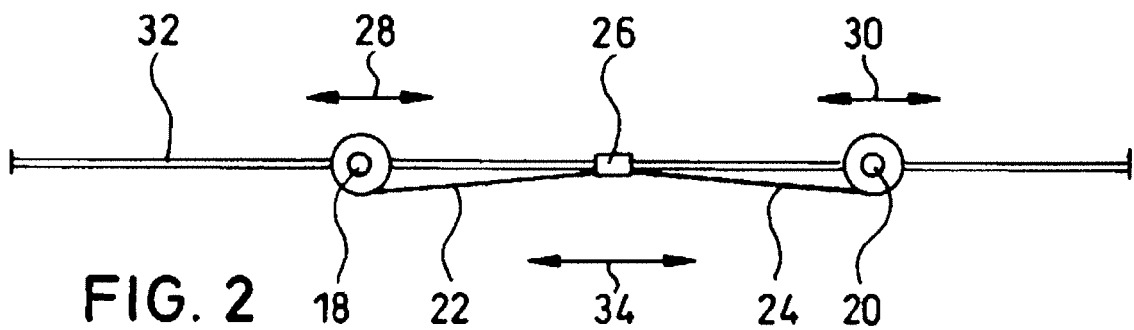
FIG. 2 is a view similar to that of FIG. 1 but which shows a shade arrangement with two shades that are coupled to one another via a pull located between them.

FIG. 2 shows a shade arrangement with two shade rollers 18, 20, shade fabrics 22, 24 to a respective one of the shade rollers 18, 20, and a pull 26 located between the shade rollers 18, 20. The shade rollers 18, 20 can each be moved by separate actuators (not shown) in the direction of the double arrows 28, 30, respectively, in side guide rails (only guide rail 32 being shown in the figure). The size of the shading surface formed by the shade fabrics 22, 24 can be changed by moving the shade roller 20 or shade roller 18 individually or by moving the two shade rollers jointly in opposite directions. In order to change the position of the shading surface without changing its size, the two shade rollers 18, 20 are moved by the same amounts at the same time in the same direction in the direction of the double arrow 34.

Figure 3:
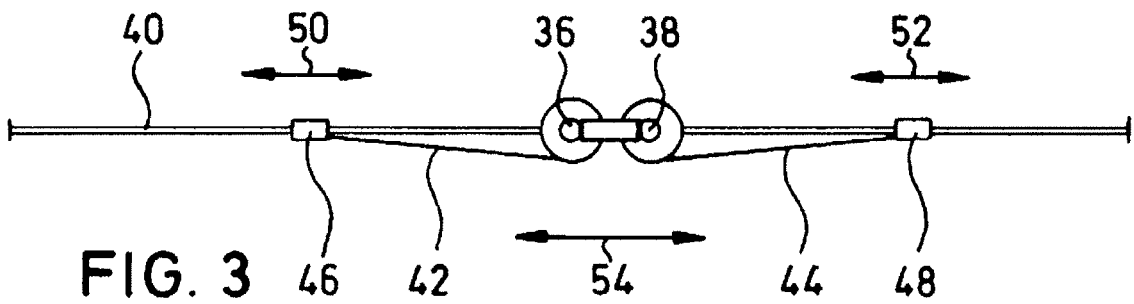
FIG. 3 is a view similar to that of FIGS. 1 & 2, but which show a shade arrangement with two shades with shade rollers that are coupled to one another.

FIG. 3 shows a shade arrangement with two shade rollers 36, 38 which are coupled to one another for joint displacement along parallel side guide rails of which only guide rail 40 is shown. The shade fabrics 42, 44, which can be taken up or unrolled in opposite directions and which are attached to a respective one of the shade rollers 36, 38, a respective pull 46, 48 have on their free ends. Each of the pulls 46, 48 can be moved in the guide rails (guide rail 40) by means of separate actuators (not shown) in the directions of the double arrows 50, 52. Analogous to the embodiment shown in FIG. 2, the size of the shading surface formed by the shade fabrics 42, 44 can be changed by moving either the pull 46, the pull 48 or both of the pulls 46, 48, in opposite directions. In order to change the position of the shading surface in the direction of the double arrow 54, the two pulls 46, 48 are each moved at the same time in the same direction and in the same amounts. In this connection, the unit formed from the shade rollers 36, 38 is set into an equilibrium position which depends on the spring force of return springs (not shown) assigned to the shade rollers 36, 38. With the same return springs, this unit is always set in the middle between the two pulls 46, 48.

FIGS. 4 to 12 show different switch constellations for operating the shade arrangements as shown in FIGS. 1 to 3. These switch constellations each comprise a first switch arrangement via which the size of the shading surface can be set, and a second switch arrangement via which the position of the shading surface can be set.

Figure 4:
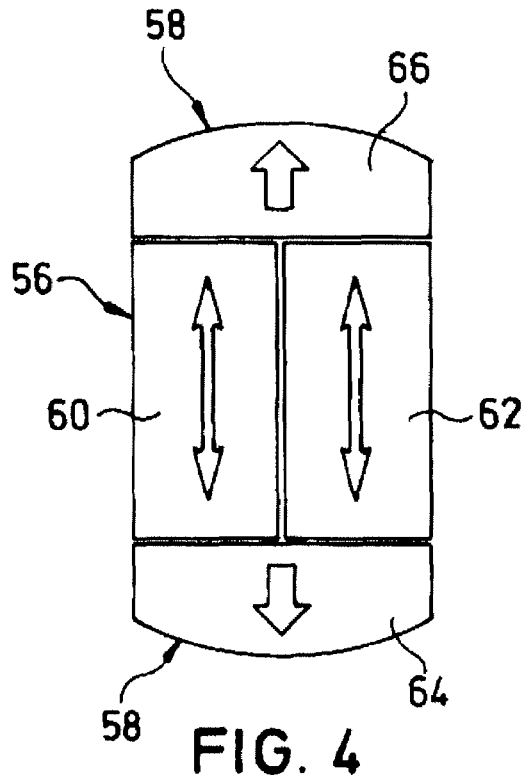
FIGS. 4 to 12 show different switch arrangements for operating the shade arrangements according to FIGS. 1 to 3.

The switch constellation of FIG. 4 comprises a first switch arrangement 56 for setting the size and a second switch arrangement 58 for setting the position of the shading surface. The first switch arrangement 56 comprises two switches 60, 62, each of which is assigned to one of the two actuators of a shade arrangement. Each of the switches 60, 62 has two operating positions in order to individually trigger the respective actuator assigned alternately in a first adjustment direction or in the opposite direction. For example, relative to FIG. 2, the shade roller 18 can be moved with the switch 60 for purposes of unrolling or taking up the shade fabric 22, and similarly, the shade roller 20 can be triggered for purposes of unrolling or taking up the shade fabric 24 with the switch 62. In this way, the shading surface can be made smaller or larger by actuating one or both of the switches 60, 62. Likewise, the second switch arrangement 58 comprises two switches 64, 66, each of which is assigned to the two actuators, the switches 64, 66 each having an operating position for triggering the two actuators with one switch causing movement jointly in the same first adjustment direction and the other switch causing movement jointly in an opposite same adjustment direction. Relative to FIG. 2, for example, by pressing the switch 64, the two shade rollers 18, 20 are moved in a first adjustment direction and by pressing the switch 66 they are moved in the other adjustment direction. In this way, the position of the shading surface can be changed.

The switches 60, 62 are made, for example, as toggle switches with a neutral position and two throw positions. The switches 64, 66 can be made, for example, as toggle switches with a neutral position and one throw position.

Figure 5:
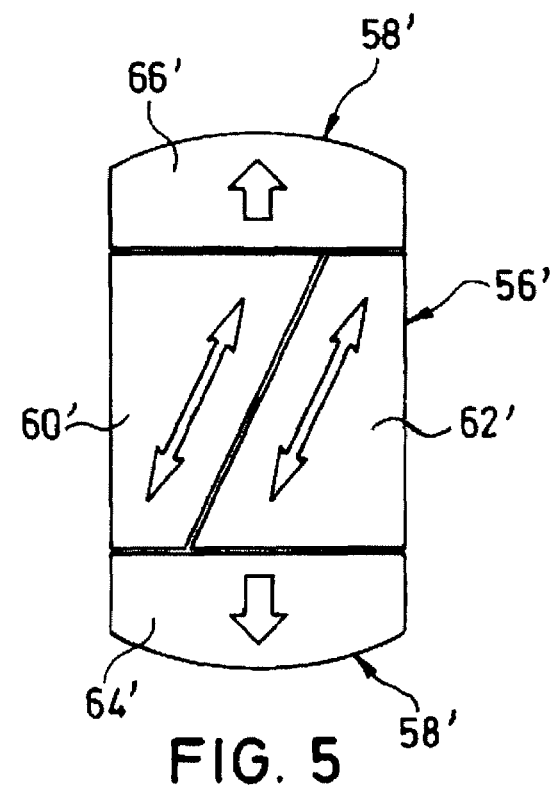

FIG. 5 shows a switch constellation similar to FIG. 4. The two switch arrangements and the switches encompassed by them are labeled with the same reference numbers, with an apostrophe added. The switch constellation of FIG. 5 differs from that of FIG. 4 simply in that the plane of separation between the switches 60', 62' of the first switch arrangement 56' runs obliquely, in order to assign these two switches analogously, for example, to the shade which is the front or the shade which is the back relative to the direction in which the operator is looking, and thus to facilitate intuitive operation.

Figure 6:
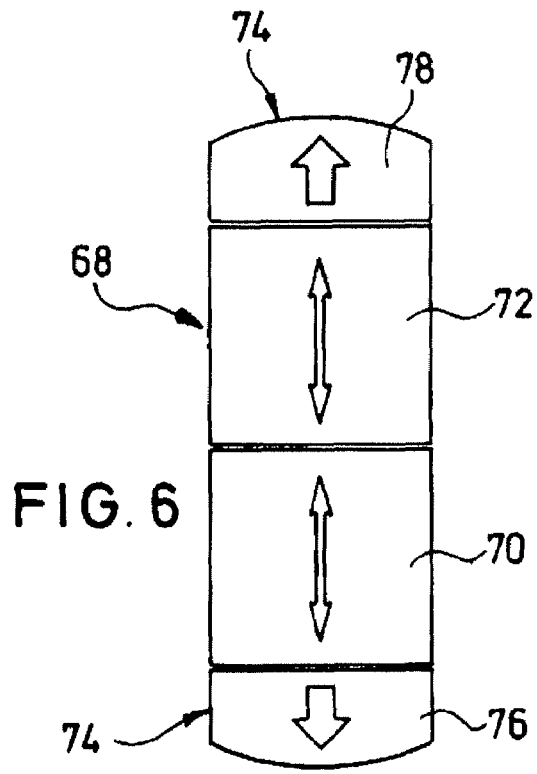

FIG. 6 in turn shows a switch constellation with a first switch arrangement 68 which comprises two switches 70, 72, and a second switch arrangement 74 which likewise comprises two switches 76, 78. The switches 70, 72 are likewise again toggle switches with two operating positions and correspond in their function exactly to the switches 60, 62, of FIG. 4. The switches 76, 78 are, in turn, toggle switches with one operating position and they correspond in their function exactly to the switches 64, 66, of FIG. 4. The successive arrangement of the switches 70, 72 corresponds, in turn, analogously, for example, to the corresponding arrangement (front-back or left-right) of the two shades of the shade arrangement.

Figure 7:
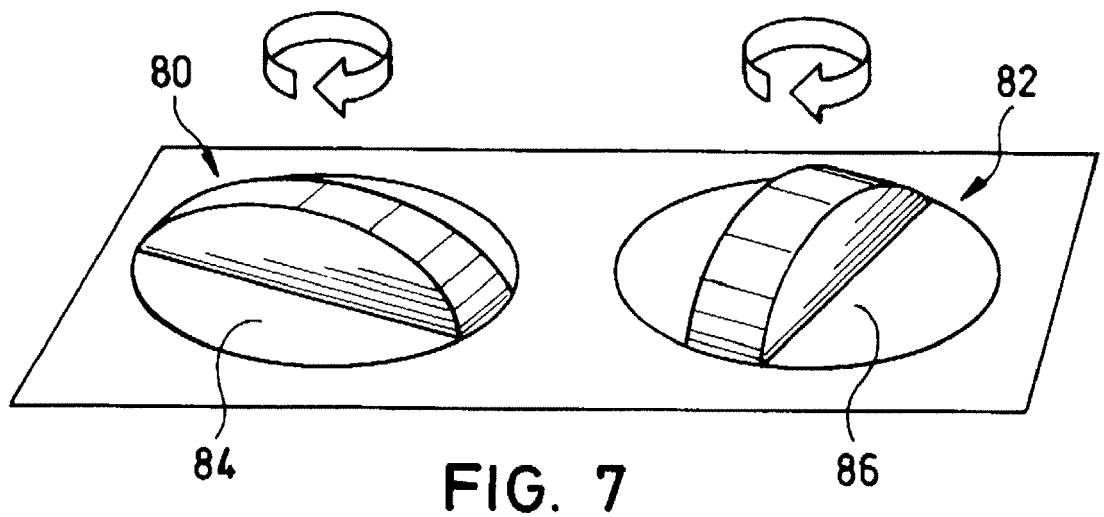

FIG. 7 shows a switch constellation with a first switch arrangement 80 for setting the size of the shading surface and a second switch arrangement 82 for setting the position of the shading surface. The first switch arrangement in this case comprises a single switch 84 which is jointly assigned to the two actuators, the switch 84 having two operating positions in order to trigger the two actuators jointly in opposite directions for purposes of making the shading surface larger or smaller. The switch 84 is made as a rotary switch which can be turned out of a neutral position alternately to the left or right into its operating positions. The second switch arrangement 82 comprises likewise a single switch 86 which is made as a rotary switch and which is assigned to the two actuators, the switch 86 having two operating positions in order to trigger the two actuators jointly in the same direction in one adjustment direction or the other adjustment direction and in this way to change the position of the shading surface.

Figure 8:
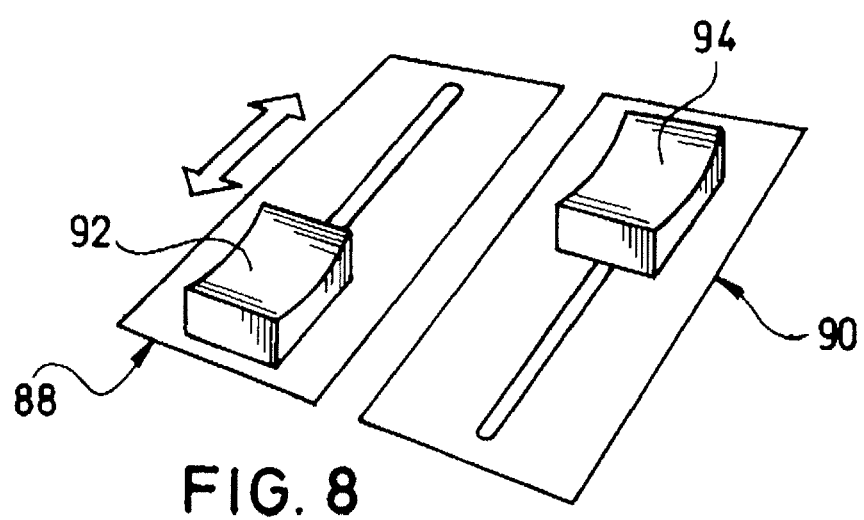

FIG. 8 shows a switch constellation with a first switch arrangement 88 for setting the size of the shading surface and a second switch arrangement 90 for setting the position of the shading surface. While the switches shown in FIGS. 4 to 7 are each ON-OFF switches, which either establish or interrupt current supply to the assigned actuators, with the switch constellation as shown in FIG. 8 another operating concept is implemented. The first switch arrangement 88 in turn comprises a single switch 92 which is assigned to both actuators jointly, the switch 92 being designed as a selector switch, with a displacement position pre-selected by the operator corresponding to a certain size of the shading surface. The second switch arrangement 90, in turn, comprises a single switch 94 which is assigned to the two actuators; the switch 94 is also designed as a selector switch with a pre-selected displacement position corresponding to a certain position of the shading surface.

Figure 9:
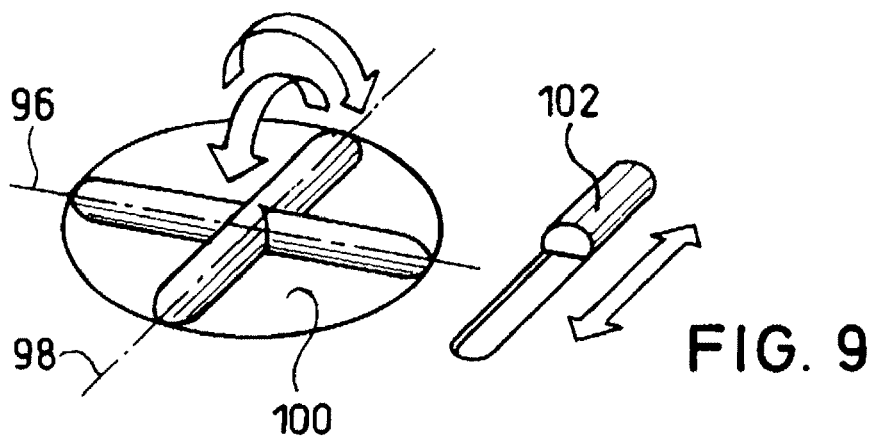

FIG. 9 shows a switch constellation analogous to a so-called "joystick" or "trackball" which combines a first switch arrangement for setting the size of the shading surface and a second switch arrangement for setting the position of the shading surface. The switch 100 can be moved around the two rocker axes 96, 98 in each of two directions, specifically to the front and back and to the right and left. The switch constellation of FIG. 9 accordingly corresponds to the operating concept in which each of the two switch arrangements has one switch with two operating positions, roughly corresponding to FIG. 7. By throwing the switch 100 around the rocker axis 96, for example, the size of the shading surface, and by throwing it around the rocker axis 98, the position of the shading surface are set. In addition, a changeover switch 102 is assigned to the switch 100 with which the function of the switch 100 can be changed such that the first of the two actuators is controlled by moving it around the rocker axis 96 and the second actuator can is controlled by moving it around the rocker axis 98 on an individual basis. After switchover, the switch 100 accordingly has the function which corresponds to that of the two toggle switches in the first switch arrangement of FIGS. 4 to 6.

Figure 10:
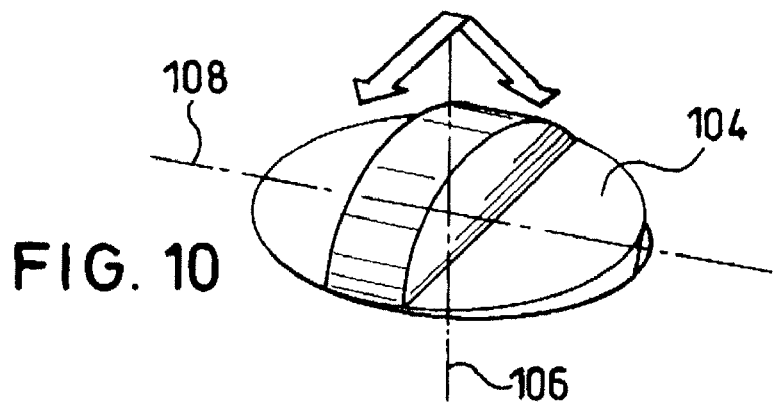

FIG. 10 shows a switch constellation in which, in turn, the functions of a first switch arrangement for setting the size of the shading surface and the function of a second switch arrangement for setting the position of the shading surface are combined in a single switch 104. For operation of the first switch arrangement, the switch 104 can be turned, for example, around an axis of rotation 106 out of a neutral position in two directions in order to set the size of the shading surface; for the function of the second switch arrangement, in order to set the position of the shading surface, the switch 104 can be swung around the rocker axis 108 which is perpendicular to axis 106, extending in the direction shown or at 90° thereto in the same plane.

Figure 11:
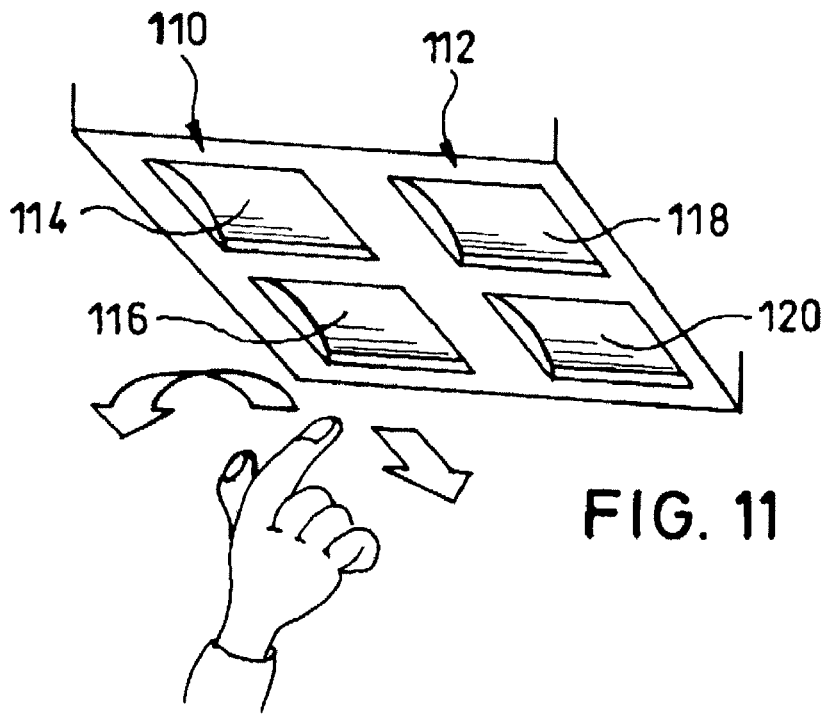

FIG. 11 shows a switch constellation with a first switch arrangement 110 for setting the size of the shading surface and a second switch arrangement 112 for setting the position of the shading surface. The first switch arrangement 110 comprises two contact switches 114, 116 which are each assigned to two actuators, and by means of which the actuators can be triggered for purposes of making the shading surface larger or smaller. The second switch arrangement 112, likewise, comprises two contact switches 118, 120 which are assigned to the two actuators, and by means of which these actuators are triggered for purposes of moving the shading surface in one adjustment direction or the other. Instead of the contact switches 114, 116 and 118, 120, other sensitive surfaces can be used which can be actuated, for example, by a hand movement in front of the surface.

Figure 12:
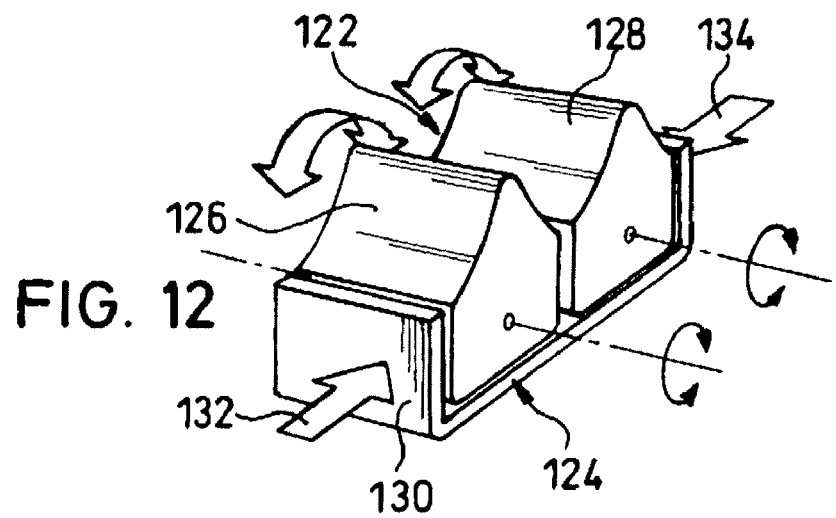

Finally, FIG. 12 shows a switch constellation in which a first switch arrangement 122 is provided for setting the size of the shading surface and a second switch arrangement 124 is provided for setting the position of the shading surface. The first switch arrangement 122 comprises two successive switches 126, 128 which are made as toggle switches and which individually trigger a respective actuator in the two adjustment directions; for example, as in FIGS. 4 to 6, the switches 126, 128 are arranged on a switch 130 which is common to them, which is made, for example, as a sliding-dolly regulator, which can be moved in the direction of the arrows 132, 134 in order to set the position of the shading surface. The switch constellation shown in FIG. 12 also makes it possible to simultaneously press the two switches 126, 128 together or apart to make the shading surface larger or smaller by simultaneous movement of the two actuators opposite one another.

What is claimed is:

1. A shade arrangement for a vehicle roof with a transparent roof surface, comprising:
    at least one shade with a shade fabric attached at one end to a shade pull and at an opposite end to a shade roller onto which the shade fabric can be rolled and from which the shade fabric can be unrolled, the shade pull and shade roller being independently movable in side guide rails to set the size and position of a shading surface formed by the shade fabric; and
    an operating means comprising a first switch arrangement for setting the size of the shading surface by taking up and unrolling the shade fabric of the at least one shade by movement of one of the shade pull and shade roller relative to the other, and a second switch arrangement for setting the position of the shading surface without changing its size by joint movement of the shade pull and shade roller in the same direction
    wherein, for facilitating control of said movements with one hand, the first switch arrangement comprises a switch which has two operating positions, a first position of which triggers relative movement between the shade pull and shade roller toward each other and a second position of which triggers relative movement between the shade pull and shade roller away from each other, and said second switch arrangement comprises two switches, a first of the two second switches having an operating position for triggering said joint movement of the shade pull and shade roller in a first direction and being located at a side of the first switch arrangement corresponding to said first direction and a second of the two second switches having an operating position for triggering said joint movement of the shade pull and shade roller in an opposite second direction and being located at an opposite side of the first switch arrangement from the first of the two said second switches.

2. Shade arrangement as claimed in claim 1, wherein the at least one shade comprises two said shades, the shade fabric of which can be rolled onto the respective shade roller and from which the shade fabric can be unrolled, the respective shade pull and shade roller being independently movable in the side guide rails to set the size and position of the shading surface formed by the respective shade fabric; wherein the first switch arrangement comprises a pair of adjacently positioned first switches, a respective said first switch being associated with each one of said shades for triggering said relative movement between the respective shade pull and shade roller toward and away from each other, and wherein said two switches of the second switch arrangement are operative for triggering the simultaneous movement of both shades in the same direction by the same amount.

3. Shade arrangement as claimed in claim 2, wherein the relative position of the first switches with respect to each other corresponds to the relative position of the two shades with respect to each other.

* * * * *